United States Patent [19]
Arai

[11] Patent Number: 5,998,992
[45] Date of Patent: Dec. 7, 1999

[54] LENGTH MEASURING APPARATUS EMPLOYING MAGNETOSTRICTIVE DELAY LINE

[75] Inventor: Eisaku Arai, Tokyo, Japan

[73] Assignee: Macome Corp., Tokyo, Japan

[21] Appl. No.: 09/015,038

[22] Filed: Jan. 28, 1998

[30] Foreign Application Priority Data

Jan. 30, 1997 [JP] Japan ................................. 9-017018

[51] Int. Cl.$^6$ ............................. G01B 7/14; G01B 17/00; G01B 7/26; G01F 23/30
[52] U.S. Cl. ................................ 324/207.13; 324/207.24
[58] Field of Search ........................ 324/207.13, 207.24, 324/235, 226, 262; 333/148; 73/290 V, 313

[56] References Cited

U.S. PATENT DOCUMENTS 5,717,330  2/1998  Moreau et al. ..................... 324/207.13

*Primary Examiner*—Walter E. Snow
*Attorney, Agent, or Firm*—Bauer & Schaffer, LLP

[57] ABSTRACT

A length measuring apparatus employing a magnetostrictive delay line according to the present invention includes a drive coil (4), a receiving coil (3) provided on an outer periphery of the magnetostrictive delay line (1) over the whole length measuring range thereof, the magnetostrictive delay line (1) uniformly magnetized in its length direction, and a short-circuit ring (2) disposed over an outer periphery of the receiving coil (3). Ultrasonic vibration (C) is generated in the magnetostrictive delay line (1) by using the drive pulse (A) applied to the drive coil (4). A pulse current (B) generated in the receiving coil (3) is detected when the ultrasonic vibration (C) is propagated in the magnetostrictive delay line (1) and passes by a position where the short-circuit ring (2) is disposed. A position of the short-circuit ring (2) is measured based on a time from generation of the drive pulse (A) to generation of the pulse current (B) in the detection coil 3.

8 Claims, 7 Drawing Sheets

LENGTH MEASURING APPARATUS EMPLOYING MAGNETOSTRICTIVE DELAY LINE

BACKGROUND

1. Field of the Invention

The present invention relates to a length measuring apparatus employing a magnetostrictive line suitable for use in measurement of a gasoline level surface in a petrol tank of a petrol station, detection of a stroke of a piston rod assembled in a hydraulic cylinder, detection of a position of a movable portion of various kinds of industrial machines and so on.

2. Background of the Invention

A length measuring apparatus employing an ultrasonic magnetostrictive delay line whose length is extended or reduced by application of a magnetic field thereto includes a length measuring apparatus employing an ultrasonic magnetostrictive delay line proposed by the assignee of this application and disclosed in U.S. Pat. No. 5,583,433.

The length measuring apparatus employing the ultrasonic magnetostrictive delay line will hereinafter be described with reference to FIG. 1. As shown in FIG. 1, an ultrasonic magnetostrictive delay line 10 is provided. A magnet piece 11 is disposed away from the ultrasonic magnetostrictive delay line 10 by a predetermined distance so as to be movable in the length direction of the ultrasonic magnetostrictive delay line 10 and so as to be opposed thereto. A detection coil (receiving coil) 3 is wound around the ultrasonic magnetostrictive delay line 10 over the whole area of a length measuring range thereof. A wave transmitter 4 (having a drive coil) is disposed at one end of the ultrasonic magnetostrictive delay line 10. A drive pulse generator circuit 5 applies a predetermined drive pulse A to the wave transmitter 4. A detector 6 detects a detection pulse signal B as an induced voltage generated in the detection coil 3. An arithmetic circuit 7 calculates a delay time of a detection pulse relative to a drive pulse to thereby output a signal corresponding to the distance from an output terminal e thereof. A ultrasonic vibration C from the wave transmitter 4 is propagated in the length direction of the magnetostrictive delay line 10.

As shown in FIG. 7A, when the ultrasonic vibration C from the wave transmitter 4 is applied to the ultrasonic magnetostrictive delay line 10 based on the drive pulse A from the drive pulse generator circuit 5, the ultrasonic vibration is propagated in the ultrasonic magnetostrictive delay line 10. A detection pulse signal B shown in FIG. 7B is a pulse current generated at the detection coil 3. In FIGS. 7A and 7B, a time $T_1$ is a time required for the ultrasonic vibration to be reciprocated in the above ultrasonic magnetostrictive delay line 10, and a time $T_2$ is a time from a timing of the drive pulse A to a timing of the detection pulse B.

When the drive pulse A from the drive pulse generator circuit 5 is applied to a drive coil of the wave transmitter 4, a magnetic field is generated in the drive coil. The magnetic field generated in the drive coil produces a magnetostriction effect to the ultrasonic magnetostrictive delay line 10, and the ultrasonic vibration C is propagated in the ultrasonic magnetostrictive delay line 10.

At this time, although a pulse voltage is not produced when only the detection coil 3 is provided, if the magnetic piece 2 is disposed at a position close to the ultrasonic magnetostrictive delay line 10, then the ultrasonic magnetostrictive delay line 10 is partially magnetized. As a result, when the ultrasonic vibration c passes by the magnetized portion of the ultrasonic magnetostrictive delay line 10, the detection pulse B resulting from an induced voltage is generated in the detection coil 3 due to a so-called reverse magnetostrictive effect in which magnetization of the ultrasonic magnetostrictive delay line 10 is changed. The detection pulse B is generated twice due to reflection thereof at an open end. This first detection pulse B is detected by the detection circuit 6.

If the magnet piece 2 is moved along the ultrasonic magnetostrictive delay line 10, the time $T_2$ from the generation of the drive pulse A to the generation of the detection pulse B in the detection coil 3 is changed in proportion to a distance by which the magnet piece 2 is moved. The drive pulse A from the drive pulse generator circuit 5 and the detection pulse B from the detection circuit 6 are supplied to the arithmetic circuit 7. The arithmetic circuit 7 calculates a time from the generation of the drive pulse A to the detection of the detection pulse B and then outputs the output signal corresponding to the distance from the output terminal e thereof.

The ultrasonic vibration C transmitted from the wave transmitter 4 is propagated in the ultrasonic magnetostrictive delay line 10 and repeatedly reflected by one end portion thereof and the other end thereof, finally gradually being attenuated to disappear.

Since a length L of the ultrasonic magnetostrictive delay line 10 is previously known, the length measuring apparatus is arranged by setting a period $T_1$ of generation of the drive pulse A in the drive pulse generator circuit 5 to the same as a period in which the ultrasonic vibration C is reciprocated in the ultrasonic magnetostrictive delay line 10 having the length L and then returned to the wave transmitter 4.

A condition that the drive pulse generator circuit 5 generates the drive pulse A is set such that when the ultrasonic vibration C travels by the length 2L and is reflected at an end portion, where the wave transmitter 4 is provided, of the ultrasonic magnetostrictive delay line 10, the wave transmitter 4 is driven to generate a new ultrasonic vibration so that its phase should be the same as a phase of the ultrasonic vibration C.

As described above, since the strong ultrasonic vibration C having a matched phase can be obtained by overlapping the ultrasonic vibration C and a new ultrasonic vibration and hence a detection wave having a large vibration with a satisfactory S/N ratio can be obtained, it is unnecessary to suppress a reflected wave by a non-reflection supporting member. Therefore, it is possible to downsize the whole length measuring apparatus to an extent of a space of the non-reflection supporting body.

However, since in the above length measuring apparatus employing the ultrasonic magnetostrictive delay line magnetization of the ultrasonic magnetostrictive delay line 10 carried out by the magnet piece 2 is recorded in the direction in which the magnet piece 2 is moved, hysteresis is produced. If a magnetostrictive delay line having no remanence is employed, no hysteresis is produced but the ultrasonic vibration becomes smaller, which makes it difficult to detect a position. As a result, disadvantageously the magnetostrictive delay line presenting large ultrasonic vibration and large remanence is inevitably employed.

If a distance between the magnet piece 2 and the ultrasonic magnetostrictive delay line 10 is changed, then a voltage induced in the detection coil 3 is increased or decreased, which prevents a stable detection of the position of the magnet piece 2.

SUMMARY OF THE INVENTION

In view of such aspects, it is an object of the present invention to provide a length measuring apparatus employing a magnetostrictive delay line which can reduce hysteresis of a magnetostrictive delay line and stably detect a position of a detection piece.

A length measuring apparatus employing a magnetostrictive delay line according to the present invention is one in which the wave transmitter is provided at one end of the magnetostrictive delay line whose other end is made as an open end, a detection coil is provided on an outer periphery of the magnetostrictive delay line over the whole length measuring range thereof, a detection piece is provided so as to be movable along the magnetostrictive delay line, and a position of the detection piece is measured based on a time from application of a drive pulse to the wave transmitter to generation of a detection pulse current in the detection coil. The magnetostrictive delay line is previously uniformly magnetized in its length direction and the detection piece is a short-circuit ring formed of a conductive member and provided over an outer periphery of the detection coil. Ultrasonic vibration is generated in the magnetostrictive delay line by using the drive pulse applied to the wave transmitter, a pulse current generated in the detection coil is detected when the ultrasonic vibration is propagated in the magnetostrictive delay line and passes by a position where the short-circuit ring is disposed, and a position of the short-circuit ring is measured based on a time from generation of the drive pulse to generation of the pulse current in the detection coil.

According to the length measuring apparatus employing the magnetostrictive delay line of the present invention, the detection piece is a metal plate having an aperture through which the detection coil is inserted.

According to the length measuring apparatus employing the magnetostrictive delay line of the present invention, a timing of applying the drive pulse to the wave transmitter is matched with a time when the ultrasonic vibration propagated in the magnetostrictive delay line is returned to the position, where the wave transmitter is disposed, of the magnetostrictive delay line 1 after being reflected by the open end which is the other end thereof.

According to the length measuring apparatus employing the magnetostrictive delay line of the present invention, when the ultrasonic vibration propagated in the magnetostrictive delay line is returned to the position, where the wave transmitter is disposed, of the magnetostrictive delay line after being reflected by the open end which is the other end thereof, a pulse current generated in the wave transmitter is detected, and the drive pulse is applied to the wave transmitter in synchronization with the pulse current generated in the wave transmitter, thereby a next ultrasonic vibration being generated in the magnetostrictive delay line.

According to the length measuring apparatus employing the magnetostrictive delay line of the present invention, a ratio of a time from generation of the drive pulse to a generation of the next drive pulse to a time from generation of the drive pulse to generation of the detection pulse current in the detection coil is calculated, and based thereon a position of the detection piece is detected.

According to the length measuring apparatus employing the magnetostrictive delay line of the present invention, a DC current is made flowing from a current generator circuit in the detection coil and thereby the magnetostrictive delay line is uniformly magnetized in its length direction.

According to the length measuring apparatus employing the magnetostrictive delay line of the present invention, a DC current is employed as a pulse current made flowing in the detection coil and thereby the magnetostrictive delay line is uniformly magnetized in its length direction.

According to the length measuring apparatus employing the magnetostrictive delay line of the present invention, since the short-circuit ring is employed as the detection piece instead of the magnet piece, a magnetization state of the magnetostrictive delay line is prevented from being disturbed, which allows a high-accuracy position detection with no hysteresis when the magnetostrictive delay line having large remanence is employed. Since the detection piece is a metal plate having an aperture through which the detection coil is inserted, it is possible to easily manufacture an insertion aperture through the metal plate, which allows achievement of reduced costs, improved degree of freedom in detection and fabrication thereof, and improved convenience. Since the voltage induced in the detection coil is not changed even if the center axis of the short-circuit ring is fluctuated relative to that of the magnetostrictive delay line, it is possible to detect the position of the short-circuit ring stably. Since the timing of generating the drive pulse is matched with a time required for the ultrasonic vibration to be reciprocated in the magnetostrictive delay line once, it is possible to obtain the pulse current in the detection coil having satisfactory S/N ratio without generation of any unnecessary reflected wave.

When the ultrasonic vibration propagated in the magnetostrictive delay line is returned to the position, where the wave transmitter is disposed, of the magnetostrictive delay line after being reflected by the open end which is the other end thereof, a pulse current generated in the wave transmitter is detected, and the drive pulse is applied to the wave transmitter in synchronization with the pulse current generated in the wave transmitter, thereby a next ultrasonic vibration being generated in the magnetostrictive delay line. Therefore, it is possible to obtain the pulse current in the detection coil having satisfactory S/N ratio without generation of any unnecessary reflected wave. At the same time, since a ratio of a time from generation of the drive pulse to a generation of the next drive pulse to a time from generation of the drive pulse to generation of the detection pulse current in the detection coil is calculated, and based thereon a position of the detection piece is detected, it is possible to achieve an effect in which the position of the detection piece can be detected regardless of the speed at which the ultrasonic vibration is propagated in the magnetostrictive delay line.

Since a DC current is made flowing from a current generator circuit in the detection coil and thereby the magnetostrictive delay line is uniformly magnetized in its length direction, the magnetostrictive delay line is prevented from being reduced in magnetization due to a secular change and also prevented from being magnetized by an external magnetic field, thereby stable detection of the position being constantly possible. Since the pulse current is employed as the DC current made flowing in the detection coil and thereby the magnetostrictive delay line is uniformly magnetized in its length direction, the consumed current can be reduced, and the magnetostrictive delay line is prevented from being reduced in magnetization due to a secular change and also prevented from being magnetized by an external magnetic field, thereby stable detection of the position being constantly possible.

DESCRIPTION OF THE PREFERRED EMBODIMENTS

A length measuring apparatus employing an ultrasonic magnetostrictive delay line according to embodiments of the present invention will hereinafter be described with reference to FIGS. 2 through 8.

Figure 2:
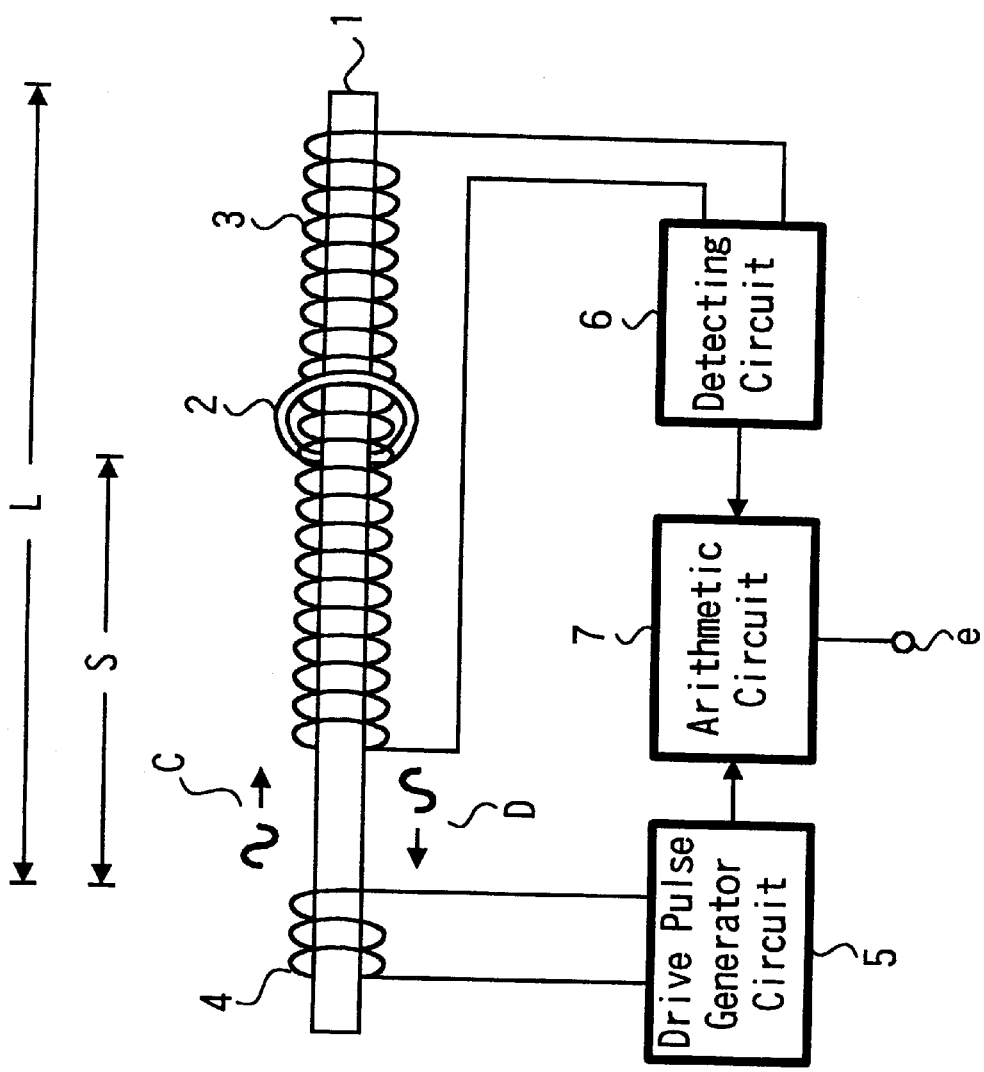
FIG. 2 is a diagram showing an arrangement of a length measuring apparatus employing a magnetostrictive delay line according to a first embodiment of the present invention.

As shown in FIG. 2, a length measuring apparatus employing an ultrasonic magnetostrictive delay line according to a first embodiment includes a magnetostrictive delay line uniformly magnetized in its length direction. A receiving coil (detection coil) 3 is wound around the magnetostrictive delay line uniformly magnetized in its length direction over the whole length measuring range thereof. A short-circuit ring 2 formed of a conductive member is disposed so as to be movable over a periphery of the receiving coil 3 in the length direction of the magnetostrictive delay line 1 uniformly magnetized in its length direction. A drive coil (wave transmitter) 4 is disposed on one end of the magnetostrictive delay line 1 uniformly magnetized in its length direction. A drive pulse generator circuit 5 applies a predetermined drive pulse A to the drive coil 4 at a predetermined pulse period. A detecting circuit 6 detects a detection pulse signal as an induced voltage generated in the receiving coil 3. An arithmetic circuit 7 calculates a delay time of a detection pulse relative to the drive pulse and then outputs a signal corresponding to a distance from an output terminal e thereof. An ultrasonic vibration C from the drive coil 4 is propagated in the magnetostrictive delay line 1 uniformly magnetized in its length direction. An ultrasonic vibration D is reflected by an open end of the magnetostrictive delay line 1 uniformly magnetized in its length direction.

Figure 1:
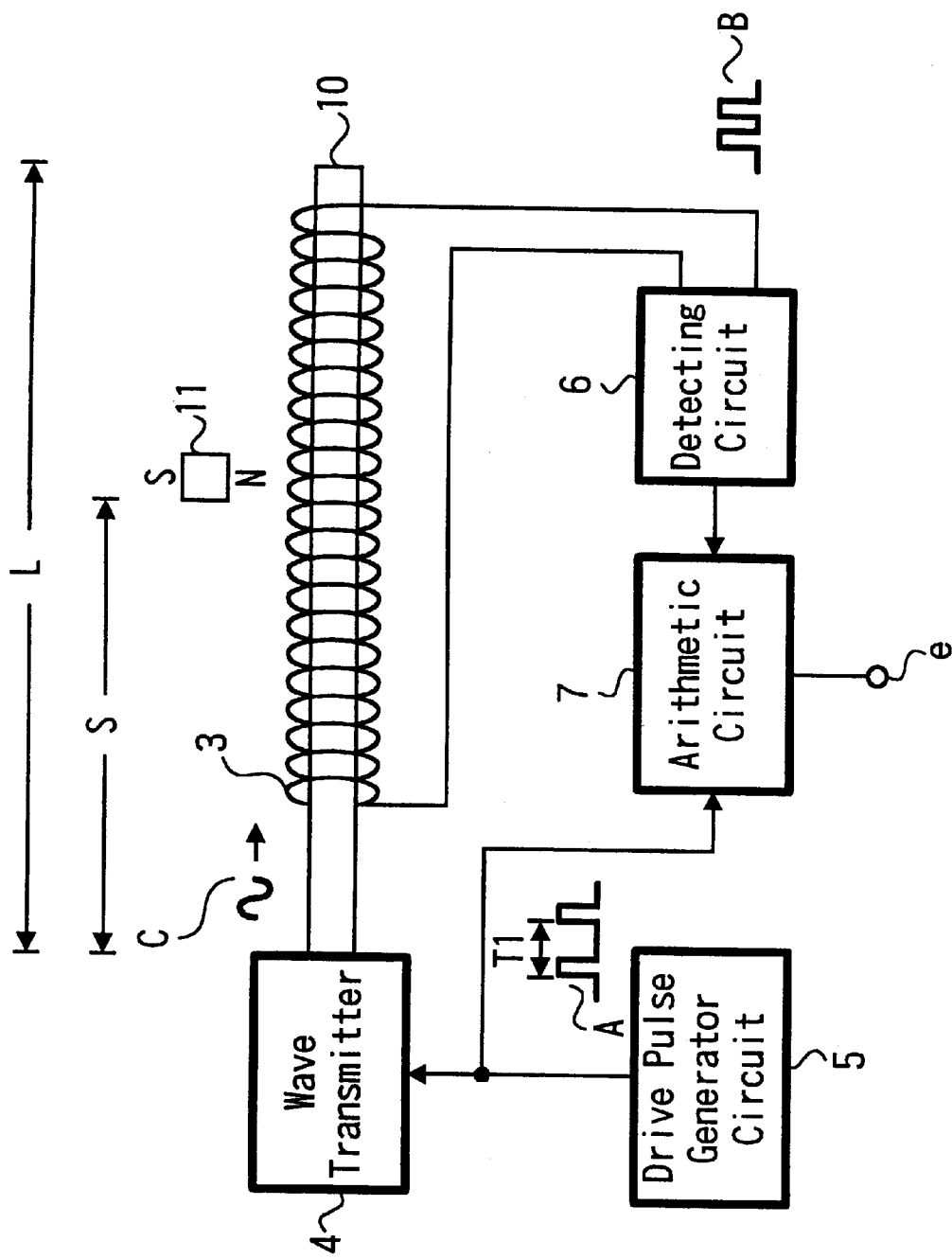
FIG. 1 is a diagram showing an arrangement of a length measuring apparatus employing an ultrasonic magnetostrictive delay line.

The length measuring apparatus employing the ultrasonic magnetostrictive delay line according to the first embodiment shown in FIG. 2 is different from the length measuring apparatus employing the ultrasonic magnetostrictive delay line according to the prior art shown in FIG. 1 in that the magnetostrictive delay line uniformly magnetized in its length direction and the short-circuit ring 2 disposed so as to be movable over the periphery of the receiving coil 3 in the length direction of the magnetostrictive delay line 1 uniformly magnetized in its length direction are provided.

Figure 3A:
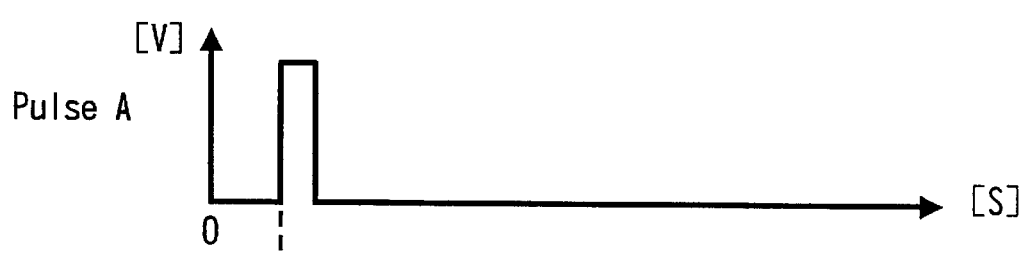
FIGS. 3A and 3B are respective waveform charts of a drive pulse and a pulse current in the length measuring apparatus employing the magnetostrictive delay line according to the first embodiment.
Figure 3B:
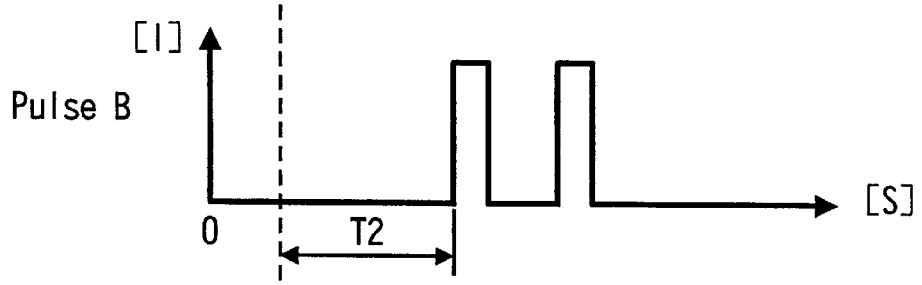

As shown in FIGS. 3A and 3B, in the above length measuring apparatus according to this embodiment, if the ultrasonic vibration C is applied from the drive coil 4 to the magnetostrictive delay line 1 uniformly magnetized in its length direction based on the drive pulse A (shown in FIG. 3A) from the drive pulse generator circuit 5, the ultrasonic vibration C is propagated in the magnetostrictive delay line 1 uniformly magnetized in its length direction. A detection pulse signal B shown in FIG. 3B is a pulse current generated in the receiving coil 3. In FIG. 3B, a time $T_2$ is a time from a timing of the drive pulse A to a timing of the detection pulse current B generated in the receiving coil 4.

When the drive pulse generator circuit 5 applies the drive pulse A to the drive coil 4 as the wave transmitter, a magnetic field is generated in the drive coil 4. The magnetic field generated in the drive coil 4 brings a magnetostriction effect to the magnetostrictive delay line 1 uniformly magnetized in its length direction, thereby the ultrasonic vibration C being propagated in the magnetostrictive delay line 1 uniformly magnetized in its length direction.

In a portion, in the magnetostrictive delay line 1, corresponding to a density of the ultrasonic vibration C, a magnetic domain thereof is rotated due to an inverse magnetostriction effect (villari effect) and hence magnetization thereof is changed. Specifically, when the ultrasonic vibration C is propagated in the magnetostrictive delay line 1 uniformly magnetized, this propagation is equivalent to that a magnet formed of a small magnetic domain corresponding to a density of the ultrasonic vibration C is propagated in the receiving coil 3 at a propagation speed of the ultrasonic vibration C. Since in the receiving coil 3 a sum of change of a magnetic flux resulting from movement of the small magnet becomes zero, an induced electromotive force generated in the receiving coil 3 is canceled. As a result, no pulse current is detected in the receiving coil 3.

However, when the ultrasonic vibration C passes by a position where short-circuit ring 2 is disposed, due to Lenz's law, a current flows in the short-circuit ring 2 in a direction in which change of a magnetic flux is prevented. Specifically, since the above-mentioned balance of a magnetic flux of the small magnet is broken at a position of the short-circuit ring 2, the pulse current B is generated in the receiving coil 3. Since the ultrasonic vibration C is reflected by the open end of the receiving coil 3, the pulse current B is generated twice. The first pulse current B is detected by the detecting circuit 6.

Figure 8:
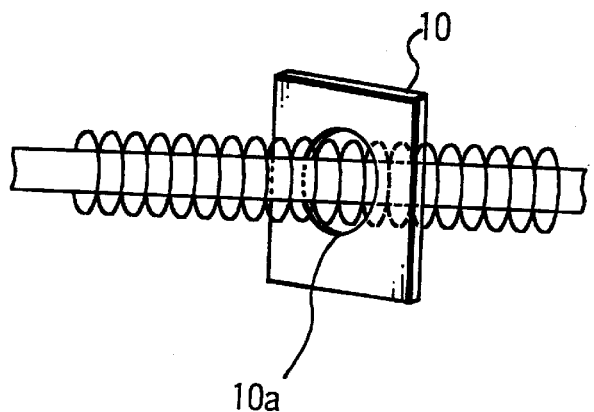
FIG. 8 is a diagram showing a modified example of a short-circuit ring used in the length measuring apparatus employing the magnetostrictive delay line according to the first embodiment of the present invention.

The short-circuit ring 2 may be made of copper, aluminum. The material for the short-circuit ring 2 is not limited to a non-magnetic material and may be a magnetic material in which an external magnetic flux does not remain. The short-circuit ring 2 may be formed as a coil or a metal tube having a plurality of windings and its both ends which are short-circuited or a metal plate 10, as shown in FIG. 8, having an insertion aperture 10a through which the receiving coil 3 is inserted, other than the short-circuit coil wound once. In particular, when the metal plate 10 having the insertion aperture 10a as the short-circuit ring 10 is employed, the metal plate 10 has both of a function as the short-circuit coil and a function of a fitting plate for holding the short-circuit plate 10. Since the metal plate 10 can be easily manufactured, a user can manufacture it by himself. Thus, since the metal plate 10 having the insertion aperture is used as a detection piece, it is possible to achieve reduced manufacturing costs, improved degree of freedom, improved convenience as compared with the magnetic piece used in the length measuring apparatus shown in FIG. 1.

When the short-circuit ring 1 is moved along the magnetostrictive delay line 1 uniformly magnetized in its length direction, the time $T_2$ from generation of the drive pulse A to generation of the pulse current B in the receiving coil 3 is changed in proportion to a distance of the movement of the short-circuit ring 2. The drive pulse A from the drive pulse generator circuit 5 and the pulse current B from the detecting circuit 6 are supplied to the arithmetic circuit 7. The arithmetic circuit 7 calculates a time from the generation of the drive pulse A to the detection of the pulse current B and outputs an output signal corresponding to the distance of the movement of the short circuit ring 2 from its output terminal e.

The ultrasonic vibration C transmitted from the drive coil 4 is propagated in the magnetostrictive delay line 1 uniformly magnetized in its length direction and repeatedly reflected by one end portion thereof and the other end portion thereof, thereby being gradually attenuated to disappear. Thus, the length measuring apparatus according to this embodiment is different from that shown in FIG. 1 in that the magnetostrictive delay line 1 uniformly magnetized in its length direction is employed and the short-circuit ring 2 is employed instead of the magnetic piece employed in the length measuring apparatus shown in FIG. 1 to generate the pulse current B in the receiving coil 3. As described above, according to this embodiment, the magnetization of the magnetostrictive delay line 1 uniformly magnetized in its length direction is prevented from being recorded in the direction in which the short-circuit ring 2 is moved, it is possible to prevent the hysteresis caused by the short-circuit ring 2 from being generated in the magnetostrictive delay line 1 uniformly magnetized in its length direction. While in the prior art fluctuation of the distance between the magnetostrictive delay line and the magnet piece influences a detection accuracy because an amount of the pulse current generated in the receiving coil is changed, in this embodiment, the sum of the magnetic flux of the above small magnet moved in the receiving coil is not changed even if the center axis of the magnetostrictive delay line is fluctuated relative to that of the short-circuit ring 2. Therefore, it is possible to stably detect the position of the short-circuit ring 2 without any influence on the amount of the pulse current.

Figure 7A:
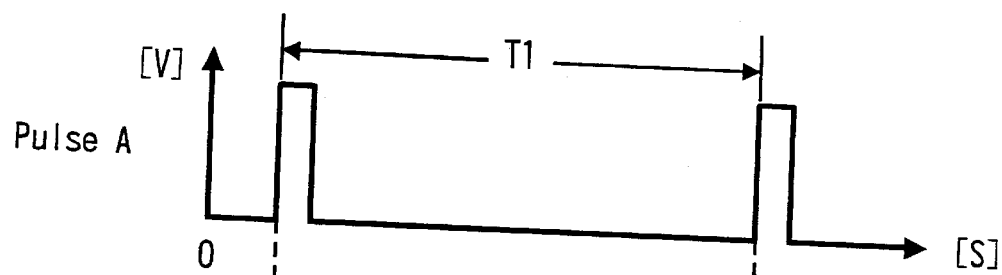
FIGS. 7A to 7C are waveform charts used to explain the length measuring apparatus shown in FIG. 1 and the length measuring apparatus employing the magnetostrictive delay line according to the first embodiment.
Figure 7B:
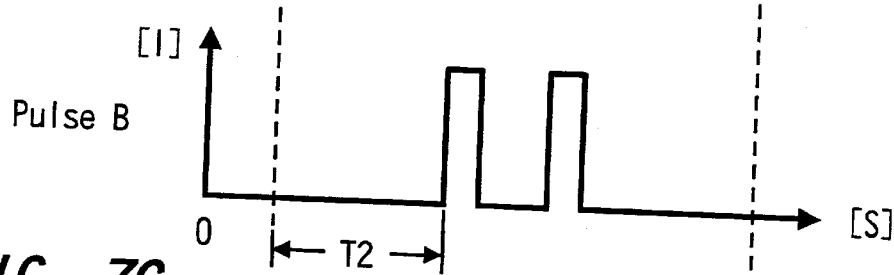
Figure 7C:

As shown in FIGS. 7A to 7C, when the ultrasonic vibration C is applied from the drive coil 4 to the magnetostrictive delay line 1 uniformly magnetized in its length direction by using the drive pulse A from the drive pulse generator circuit 5, the ultrasonic vibration C is propagated in the magnetostrictive delay line 1 uniformly magnetized in its length direction. The detection pulse signal B shown in FIG. 7B is a pulse current generated in the receiving coil 3. In FIGS. 7B and 7C, the time $T_1$ is a time required for the ultrasonic vibration to be reciprocated in the magnetostrictive delay line 1 uniformly magnetized in its length direction, and the time $T_2$ is a time from the generation of the drive pulse A to detection of the pulse current B generated in the receiving coil 3. FIG. 7C is a diagram showing a pulse current generated in the drive coil 4.

Since the length L of the magnetostrictive delay line 1 uniformly magnetized in its length direction is previously known, if the period $T_1$ in which the drive pulse generator circuit 5 generates the drive pulse A is set the same as the period in which the ultrasonic vibration C is reciprocated in the magnetostrictive delay line 1 having the length L and uniformly magnetized in its length direction, then it is possible to more effectively detect the position of the short-circuit ring 2.

Specifically, a condition that the drive pulse generator circuit 5 generates the drive pulse A is set such that when the ultrasonic vibration C travels by the length 2L and is reflected at an end portion, where the drive coil 4 is provided, of the magnetostrictive delay line 1, the drive coil 4 is driven to generate a new ultrasonic vibration so that its phase should be the same as a phase of the ultrasonic vibration C.

As described above, since the strong ultrasonic vibration C having a matched phase can be obtained by overlapping the ultrasonic vibration C and a new ultrasonic vibration and hence any unnecessary reflected wave is prevented from being generated, a detection wave having a large vibration with a satisfactory S/N ratio can be obtained. A length measuring apparatus employing a magnetostrictive delay line according to a second embodiment of the present invention operated as described above will hereinafter be described.

Figure 4:
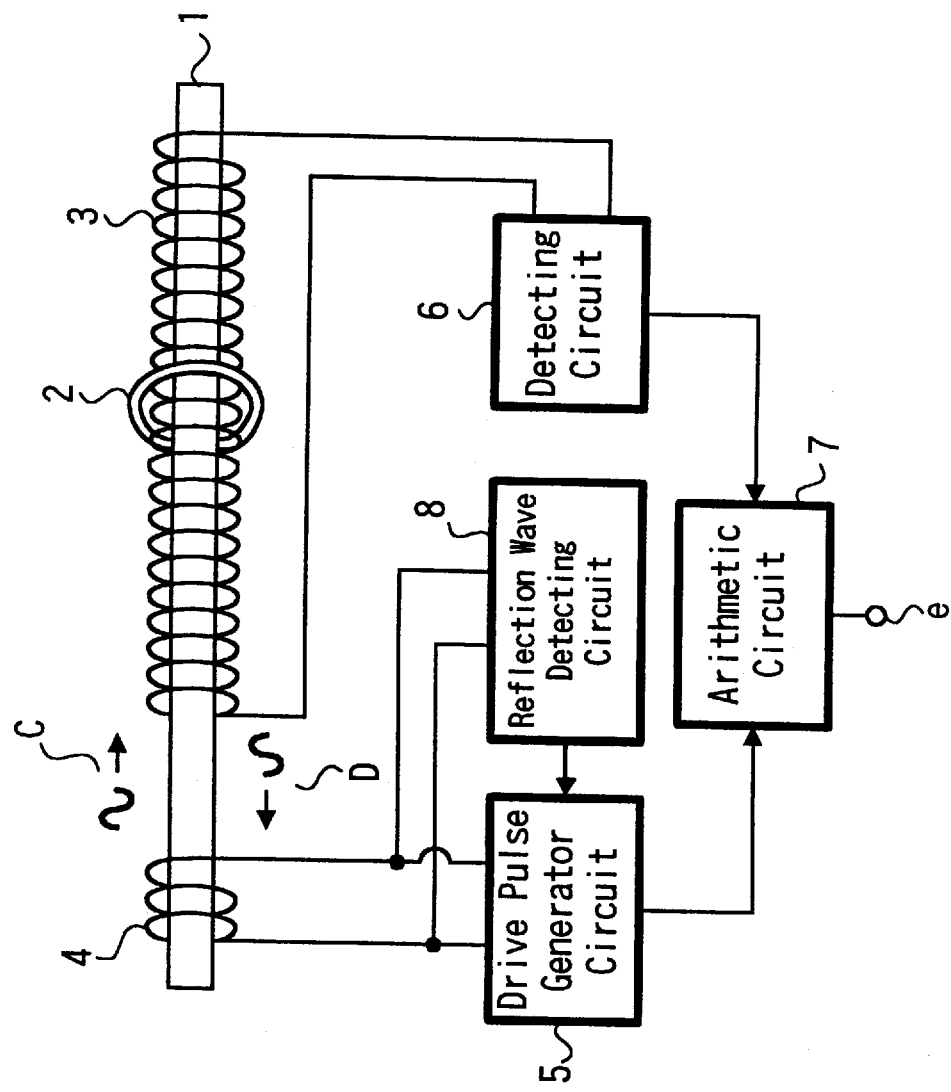
FIG. 4 is a diagram showing an arrangement of a length measuring apparatus employing a magnetostrictive delay line according to a second embodiment of the present invention.

FIG. 4 is a diagram showing a length measuring apparatus employing a magnetostrictive delay line according to a second embodiment of the present invention. In FIG. 4, like parts and circuits corresponding to those shown in FIG. 2 are marked with the same reference numerals and hence need not be described in detail. only its different point from the length measuring apparatus according to a first embodiment shown in FIG. 2 will be described and hence its point similar thereto need not be described in detail. The length measuring apparatus shown in FIG. 4 is different from that shown in FIG. 2 in that a reflected wave detecting circuit 8 for detecting a reflected ultrasonic vibration D is provided.

When the ultrasonic vibration C is propagated in the magnetostrictive delay line 1 uniformly magnetized in its length direction and the reflected ultrasonic vibration D reaches a position where the drive coil 4 is provided, the pulse current E (shown in FIG. 7C) is generated in the drive coil 4. The reflected wave detecting circuit 8 detects the pulse current E generated in the drive coil 4. The reflected wave detecting circuit 8 supplies the detected pulse current E to the drive pulse generator circuit 5. The drive pulse generator circuit 5 supplies the drive pulse A to the drive coil 4 in synchronization with the pulse current E. The next ultrasonic vibration C is propagated in the magnetostrictive delay line 1 uniformly magnetized in its length direction in accordance with the drive pulse A. Thus, it is possible to obtain the pulse current having satisfactory S/N ratio without generation of the unnecessary reflected wave.

At this time, the following equations 1 and 2 are established on the assumption that a time in which the ultrasonic vibration C is reciprocated in the magnetostrictive delay line 1 uniformly magnetized in its length direction is $T_1$, a time from the generation of the drive pulse A to the detection of the pulse current B generated in the receiving coil 3 is $T_2$, a length of the magnetostrictive delay line 1 uniformly magnetized in its length direction is L, a length from the drive coil 4 to the short-circuit ring 2 is S, and a speed at which the ultrasonic vibration C is propagated in the magnetostrictive delay line 1 is V.

$$T_1 = 2L/V \tag{1}$$

$$T_2 = S/V \tag{2}$$

If the speed V is removed from the above equations 1 and 2, then the following equations 3 and 4 are obtained.

$$T_2/T_1 = S/2L \quad (3)$$

$$S = T_2 \cdot 2L/T_1 \quad (4)$$

Therefore, when the ultrasonic vibration C is propagated in the magnetostrictive delay line 1 uniformly magnetized in its length direction, it is possible to detect the position of the short-circuit ring 2 regardless of the speed V.

Specifically, even if the propagation speed of the ultrasonic vibration C is changed due to change of a temperature coefficient of the propagation speed, it is possible to detect the position of the short-circuit ring 2 without any difficulties.

Figure 5:
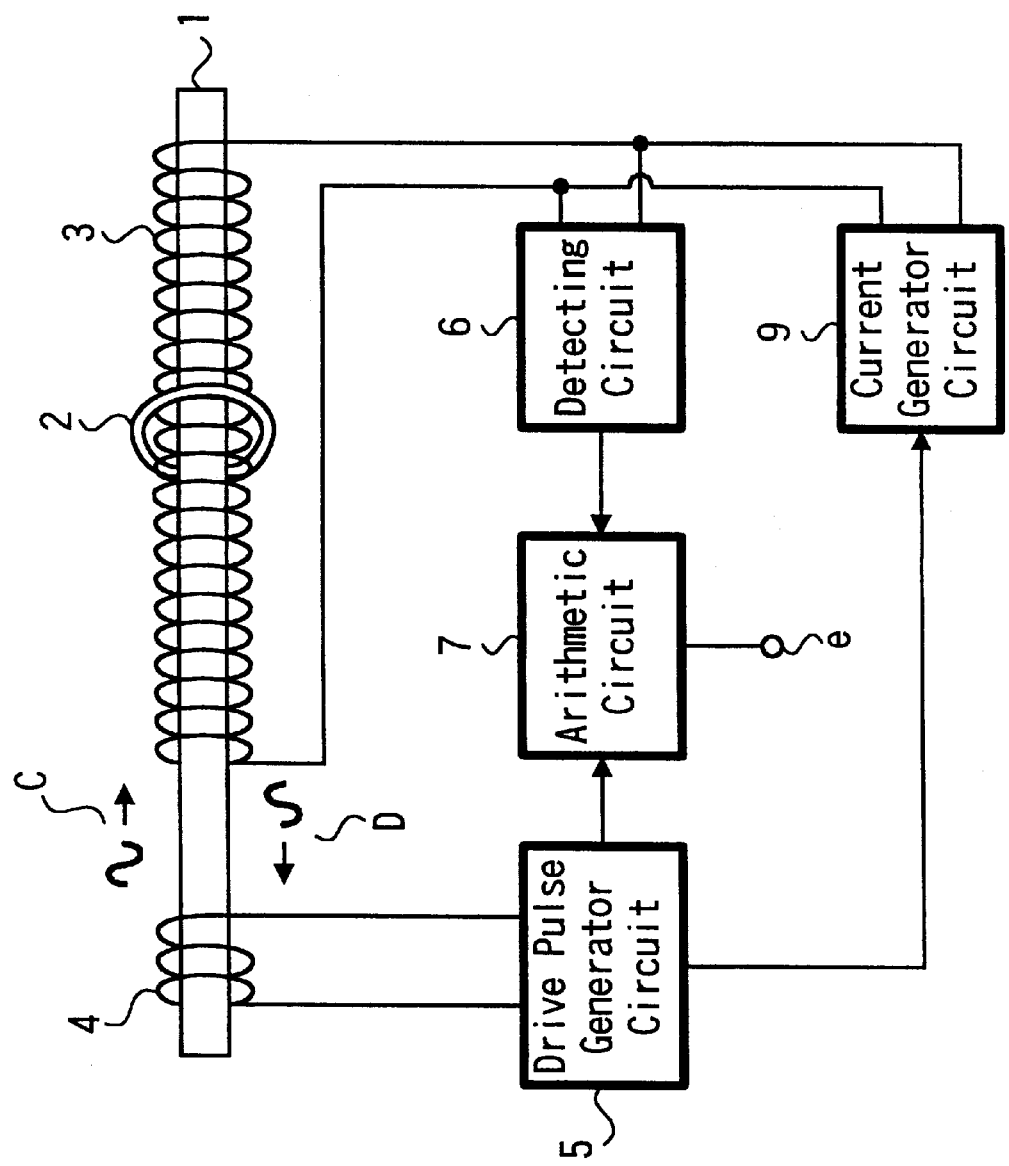
FIG. 5 is a diagram showing an arrangement of a length measuring apparatus employing a magnetostrictive delay line according to a third embodiment of the present invention.

FIG. 5 is a diagram showing an arrangement of a length measuring apparatus employing a magnetostrictive delay line according to a third embodiment of the present invention. In FIG. 5, like parts and circuits corresponding to those shown in FIG. 2 are marked with the same reference numerals and hence need not be described in detail. Only its different point from the length measuring apparatus according to a first embodiment shown in FIG. 2 will be described and hence its point similar thereto need not be described in detail. The length measuring apparatus shown in FIG. 5 is different from that shown in FIG. 2 in that a current generating circuit 9 for generating a current used for uniformly magnetizing the magnetostrictive delay line 1 is provided.

If magnetization of the magnetostrictive delay line 1 uniformly magnetized in its length direction is reduced due to a secular change or the magnetostrictive delay line 1 uniformly magnetized in its length direction is magnetized by an external magnetic field, it becomes difficult to detect the position of the short-circuit ring 2. The current generating circuit 9 makes the current flow in the receiving coil 3 to uniformly magnetize the magnetostrictive delay line 1.

When the current generating circuit 9 supplies a current to the receiving coil 3, a magnetic field is generated in the direction in which the magnetostrictive delay line 1 is pierced through the receiving coil 3. In this case, the magnetic field is generated in the length direction of the magnetostrictive delay line 1, and hence the magnetostrictive delay line 1 is uniformly magnetized in its length direction.

Since a DC current flows in the receiving coil 3 and thereby the magnetostrictive delay line 1 is constantly uniformly magnetized in its length direction, the magnetostrictive delay line 1 is prevented from being reduced in its magnetization due to a secular change and also prevented from being magnetized by an external magnetic field, which enables the position of the short-circuit ring 2 to be constantly and stably detected.

Since the current generating circuit 9 periodically makes the pulse current flow in the receiving coil 3 in synchronization with the drive pulse generating circuit 5 and hence the magnetostrictive delay line 1 is constantly and uniformly magnetized in its length direction when the position of the short-circuit ring 2 is detected, an unnecessary detection operation is omitted and hence a consumed current becomes smaller.

While in the above third embodiment the current generating circuit 9 periodically makes the pulse current flow in the receiving coil 3 in synchronization with the drive pulse generator circuit 5, it is not necessary to make the current flow in synchronization with the drive current pulse generator circuit 5 or to make the current flow periodically. The same effect can be achieved by making the current flow constantly or at a random time interval.

Figure 6:
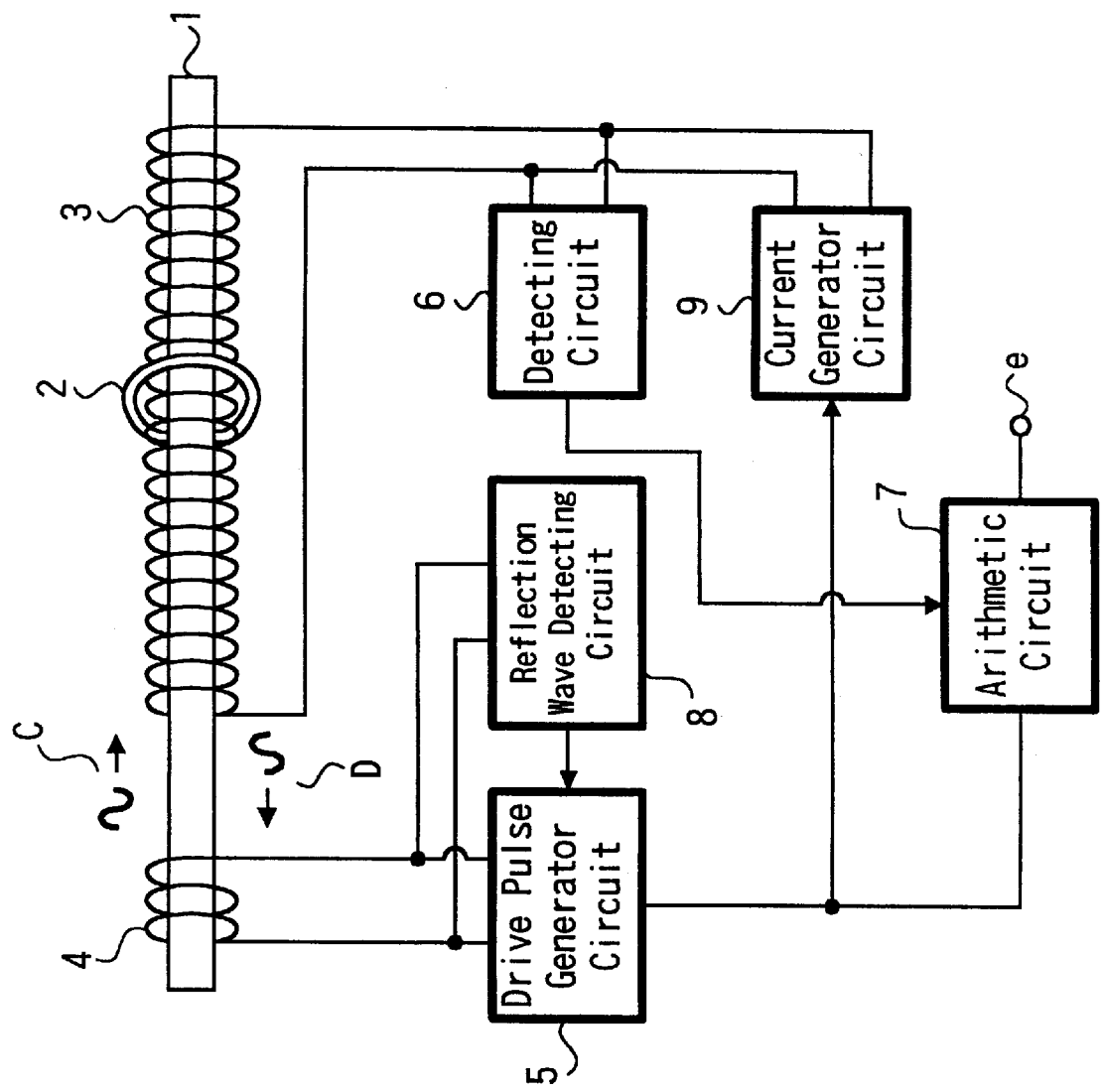
FIG. 6 is a diagram showing an arrangement of a length measuring apparatus employing a magnetostrictive delay line according to a fourth embodiment of the present invention.

FIG. 6 is a diagram showing an arrangement of a length measuring apparatus employing a magnetostrictive delay line according to a fourth embodiment of the present invention. In FIG. 6, like parts and circuits corresponding to those shown in FIG. 2 are marked with the same reference numerals and hence need not be described in detail. Only its different point from the length measuring apparatus according to a first embodiment shown in FIG. 2 will be described and hence its point similar thereto need not be described in detail. The length measuring apparatus shown in FIG. 6 is different from that shown in FIG. 2 in that a reflected wave detecting circuit 8 for detecting a reflected ultrasonic vibration D is provided and a current generating circuit 9 for generating a current used for uniformly magnetizing the magnetostrictive delay line 1 is provided.

When the ultrasonic vibration C is propagated in the magnetostrictive delay line 1 uniformly magnetized in its length direction and the reflected ultrasonic vibration D reaches a position where the drive coil 4 is provided, the pulse current E is generated in the drive coil 4. The reflected wave detecting circuit 8 detects the pulse current E generated in the drive coil 4. The reflected wave detecting circuit 8 supplies the detected pulse current E to the drive pulse generator circuit 5. The drive pulse generator circuit 5 supplies the drive pulse A to the drive coil 4 in synchronization with the pulse current E. The next ultrasonic vibration C is propagated in the magnetostrictive delay line 1 uniformly magnetized in its length direction in accordance with the drive pulse A. Thus, it is possible to obtain the pulse current having satisfactory S/N ratio without generation of the unnecessary reflected wave.

When the current generating circuit 9 supplies a current to the receiving coil 3, a magnetic field is generated in the direction in which the magnetostrictive delay line 1 is pierced through the receiving coil 3. In this case, the magnetic field is generated in the length direction of the magnetostrictive delay line 1, and hence the magnetostrictive delay line 1 is uniformly magnetized in its length direction. Since a DC current flows in the receiving coil 3 and thereby the magnetostrictive delay line 1 is constantly or periodically and uniformly magnetized in its length direction, the magnetostrictive delay line 1 is prevented from being reduced in its magnetization due to a secular change and also prevented from being magnetized by an external magnetic field, which enables the position of the short-circuit ring 2 to be constantly and stably detected.

A length measuring apparatus employing a magnetostrictive delay line according to the present invention is one in which the wave transmitter is provided at one end of the magnetostrictive delay line whose other end is made as an open end, a detection coil is provided on an outer periphery of the magnetostrictive delay line over the whole length measuring range thereof, a detection piece is provided so as to be movable along the magnetostrictive delay line, and a position of the detection piece is measured based on a time from application of a drive pulse to the wave transmitter to generation of a detection pulse current in the detection coil. The magnetostrictive delay line is previously uniformly magnetized in its length direction and the detection piece is a short-circuit ring formed of a conductive member and provided over an outer periphery of the detection coil. Ultrasonic vibration is generated in the magnetostrictive delay line by using the drive pulse applied to the wave transmitter, a pulse current generated in the detection coil is detected when the ultrasonic vibration is propagated in the magnetostrictive delay line and passes by a position where the short-circuit ring is disposed, and a position of the short-circuit ring is measured based on a time from generation of the drive pulse to generation of the pulse current in the detection coil. Therefore, it is possible to detect the ultrasonic vibration by using the short-circuit ring and the magnetostrictive delay line uniformly magnetized in its length direction, which allows achievement of an effect in which a high-accuracy detection of the short circuit ring can be obtained without any hysteresis.

According to the length measuring apparatus employing the magnetostrictive delay line of the present invention, the detection piece is a metal plate having an aperture through which the detection coil is inserted. Therefore, it is possible to easily manufacture an insertion aperture through the metal plate, which allows an achievement of reduced costs, improved degree of freedom in detection and fabrication thereof, and improved convenience.

According to the length measuring apparatus employing the magnetostrictive delay line of the present invention, a timing of applying the drive pulse to the wave transmitter is matched with a time when the ultrasonic vibration propagated in the magnetostrictive delay line is returned to the position, where the wave transmitter is disposed, of the magnetostrictive delay line 1 after being reflected by the open end which is the other end thereof. Therefore, it is possible to match the timing of generating the drive pulse with a time required for the ultrasonic vibration to be reciprocated in the magnetostrictive delay line once, and hence it is possible to achieve an effect in which the position detection can be carried out with satisfactory S/N ratio and without generation of any unnecessary reflected wave.

According to the length measuring apparatus employing the magnetostrictive delay line of the present invention, when the ultrasonic vibration propagated in the magnetostrictive delay line is returned to the position, where the wave transmitter is disposed, of the magnetostrictive delay line after being reflected by the open end which is the other end thereof, a pulse current generated in the wave transmitter is detected, and the drive pulse is applied to the wave transmitter in synchronization with the pulse current generated in the wave transmitter, thereby a next ultrasonic vibration being generated in the magnetostrictive delay line. Therefore, when the reflected ultrasonic vibration reaches the position, where the drive coil is disposed, of the wave transmitter, the drive pulse can be generated in synchronization with the pulse current generated in the drive coil, and hence it is possible to achieve an effect in which the position detection can be carried out with satisfactory S/N ratio and without generation of any unnecessary reflected wave.

According to the length measuring apparatus employing the magnetostrictive delay line of the present invention, a ratio of a time from generation of the drive pulse to a generation of the next drive pulse to a time from generation of the drive pulse to generation of the detection pulse current in the detection coil is calculated, and based thereon a position of the detection piece is detected. Therefore, it is possible to achieve an effect in which the position of the detection piece can be detected regardless of the speed at which the ultrasonic vibration is propagated in the magnetostrictive delay line.

According to the length measuring apparatus employing the magnetostrictive delay line of the present invention, a DC current is made flowing from a current generator circuit in the detection coil and thereby the magnetostrictive delay line is uniformly magnetized in its length direction. Therefore, it is possible to constantly and uniformly magnetize the magnetostrictive delay line in its length direction, and hence it is possible to achieve an effect in which the magnetostrictive delay line is prevented from being reduced in magnetization due to a secular change and also prevented from being magnetized by an external magnetic field, thereby stable detection of the position being constantly possible.

According to the length measuring apparatus employing the magnetostrictive delay line of the present invention, since a pulse current is employed as the DC current made flowing in the detection coil and thereby the magnetostrictive delay line is uniformly magnetized in its length direction, it is possible to periodically and uniformly magnetize the magnetostrictive delay line in its length direction. Therefore, it is possible to achieve an effect in which the magnetostrictive delay line is prevented from being reduced in magnetization due to a secular change and also prevented from being magnetized by an external magnetic field, thereby stable detection of the position being constantly possible and an effect in which a consumed current can be reduced.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A length measuring apparatus employing a magnetostrictive delay line, comprising:

a magnetostrictive delay line having an open end as the other end thereof;

a wave transmitter provided at one end of said magnetostrictive delay line;

a detection coil provided on an outer periphery of said magnetostrictive delay line over the whole length measuring range thereof; and a detection piece provided so as to be movable along said magnetostrictive delay line, wherein a position of said detection piece is measured based on a time from application of a drive pulse to said wave transmitter to generation of a detection pulse current in said detection coil, wherein said magnetostrictive delay line is previously uniformly magnetized in its length direction and said detection piece is a short-circuit ring formed of a conductive member and provided over an outer periphery of said detection coil, and wherein ultrasonic vibration is generated in said magnetostrictive delay line by using said drive pulse applied to said wave transmitter, a pulse current generated in said detection coil is detected when said ultrasonic vibration is propagated in said magnetostrictive delay line and passes by a position thereof where said short-circuit ring is disposed, and a position of said short-circuit ring is measured based on a time from generation of said drive pulse to generation of said pulse current in said detection coil.

2. A length measuring apparatus employing a magnetostrictive delay line according to claim 1, wherein said detection piece is a metal plate having an aperture which is bored through said detection piece and through which said detection coil is inserted.

3. A length measuring apparatus employing a magnetostrictive delay line according to claim 1 or 2, wherein a timing of applying said drive pulse to said wave transmitter is matched with a time when said ultrasonic vibration propagated in said magnetostrictive delay line is returned to the position, where said wave transmitter is disposed, of said magnetostrictive delay line after being reflected by the open end which is the other end thereof.

4. A length measuring apparatus employing a magnetostrictive delay line according to claim 1 or 2, wherein when said ultrasonic vibration propagated in said magnetostrictive delay line is returned to the position, where said wave transmitter is disposed, of said magnetostrictive delay line after being reflected by the open end which is the other end thereof, a pulse current generated in said wave transmitter is detected, and said drive pulse is applied to said wave transmitter in synchronization with said pulse current generated in said wave transmitter, thereby a next ultrasonic vibration being generated in said magnetostrictive delay line.

5. A length measuring apparatus employing a magnetostrictive delay line according to claim 4, wherein a ratio of a time from generation of said drive pulse to a generation of the next drive pulse to a time from generation of said drive pulse to generation of the detection pulse current in said detection coil is calculated, and based thereon a position of said detection piece is detected.

6. A length measuring apparatus employing a magnetostrictive delay line according to claim 1, 2 or 4, wherein a DC current is made flowing in said detection coil and thereby said magnetostrictive delay line is uniformly magnetized in its length direction.

7. A length measuring apparatus employing a magnetostrictive delay line according to claim 6, wherein a pulse current is employed as the DC current made flowing in said detection coil and thereby said magnetostrictive line is uniformly magnetized in its length direction.

8. A length measuring apparatus employing a magnetostrictive delay line according to claim 6, wherein said DC current is a pulse current made periodically flowing therein.

* * * * *